United States Patent Office.

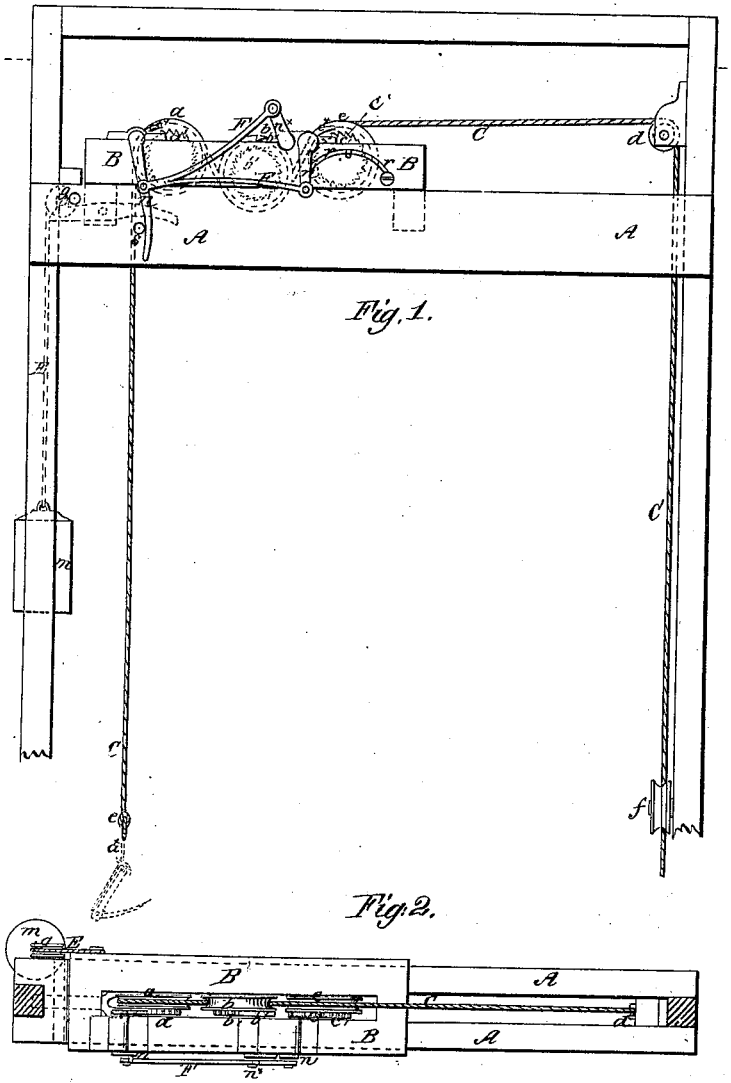

JOSEPH F. NUGENT, OF CANNONSBURG, MICHIGAN.

Letters Patent No. 76,506, dated April 7, 1868.

IMPROVED HAY-ELEVATING APPARATUS.

*The Schedule referred to in these Letters Patent and making part of the same.*

TO ALL WHOM IT MAY CONCERN:

Be it known that I, JOSEPH F. NUGENT, of Cannonsburg, in the county of Kent, and State of Michigan, have invented certain new and useful Improvements in Hay-Elevating Apparatus; and I do hereby declare that the following is a full, clear, and exact description of the same, reference being had to the accompanying drawings, making a portion of this specification, in which—

Figure 1 is a side view of a hay-elevating apparatus made according to my invention.

Figure 2 is a plan view of the same.

Similar letters of reference indicate corresponding parts in both figures.

This invention relates to that class of hay-elevating apparatus designed, after elevating the hay to the required height, to convey the same horizontally to deposit it upon the "mow" or in the loft. The invention consists in a stop provided upon the draught-rope, and so combined with a suitable carriage and track, that when the hay is lifted to the required height, the carriage will be automatically acted upon by the draught-rope to carry the hay horizontally, as just mentioned. The invention further consists in a novel arrangement of pulleys, pawls, and ratchets upon the carriage, and in relation with the draught-rope, whereby the too sudden descent of the fork or lifting-device attached to the latter is provided against. The invention further consists in a novel combination of parts, whereby the descent, at the proper time, of the fork, or equivalent device, is secured.

To enable others to understand the construction and operation of my invention, I will proceed to describe it with reference to the drawings.

A represents a horizontal or nearly horizontal track, secured upon suitable supports within the barn or building in which it is designed to store the hay. Situated upon this track, and having a longitudinal movement thereon, is a carriage, B, in which are three grooved pulleys, $a, b, c$, placed vertically and in line with each other, and secured to some fixed support. At or near one end of the aforesaid track is another grooved pulley, $d$. The draught-rope is shown at C, and is passed over the pulley $d$, then over the pulley $c$, under the pulley $b$, and over the one, $a$, whence it passes downward, and has attached to its extremity, at $a^*$, a suitable fork or like lifting-device, as indicated in red outline in fig. 1, and has provided upon it, at a suitable distance from such fork or device, a stop, $e$, which may be formed by simply tying a knot in the rope at the desired point.

The opposite end-portion of the draught-rope is carried downward from the pulley $d$, underneath a similar pulley, $f$, situated near the floor or the ground, and, when the apparatus is in use, is to be attached to a suitable whiffle-tree, operated by a horse or other draught-animal. When the draught-rope is thus drawn downward from the pulley $d$, the fork attached to the end $a^*$, with the hay thereon, is elevated until the stop $e$ strikes the under side of the carriage B, whereupon the continued motion of the draught-rope draws the carriage, and of course the fork, or equivalent device, toward the pulley $d$, until, the desired point being reached, the fork is tripped, and its load dropped into the mow or place over which the carriage has thus been brought. This being done, the horse or draught-animal is caused to retrace his path, and the carriage, with its appurtenances, is brought back to its first position upon the track A, by means of a cord or rope, E, attached thereto, passed over a suitable pulley, $g$, and having a weight, $m$, secured to its lower end, the weighted cord E thus serving to retract the carriage to its original position after each movement thereof, to carry the hay to its place of deposit.

Attached to one side of each of the pulleys, $a, b, c$, is a ratchet-wheel, the said wheels being marked respectively $a', b', c'$, and shown more clearly in dotted outline in fig. 1; and pivoted contiguously thereto upon or within the carriage B are three pawls $a^\times, b^\times, c^\times$, which work into the ratchet-wheels just mentioned, and the pivots of which are extended outward to one side of the carriage, that of the pawl $a^\times$ having attached to it a downwardly-extending lever-arm, $n$, and the others with crank-arms marked respectfully $n', n^*$, the extremities of the crank-arms being connected with the central part of the lever-arm by means of a forked connecting-rod, F, as shown more fully in fig. 1. A spring, $r$, is so arranged in relation with one of the crank-arms, as to so operate the said crank-arms, together with the lever-arm connected therewith, as to bring the several pawls $a^\times, b^\times, c^\times$, in contact or gear with their respective ratchet-wheels $a', b', c'$. Fixed upon one side of the track A is a stud, $s$, against which the lower end of the lever-arm strikes when the carriage returns to its original position, the purpose of which will presently herein appear.

When the draught-rope is operated to elevate the hay toward the carriage, as hereinbefore set forth, the ratchet-wheels of the pulleys rotate freely underneath their several pawls, thus permitting the proper and facile operation of the draught-rope in so raising the hay, but while the carriage is moving back to its first position, as hereinbefore fully explained, the pawls, catching in the ratchet-wheels, stop the rotation of their attached pulleys, so that the friction of the draught-rope upon the said three pulleys, around which it passes, prevents the descent of the fork or lifting-device attached thereto, until the carriage, reaching its original place upon the track A, brings the lower end of the lever-arm $n$ against the stud $s$, whereupon the said lever-arm is tilted and brings the pawl $a^\times$ away from its ratchet-wheel at the same time that, acting through the forked connecting-rod and crank-arms $n'$, $n^*$, it raises in like manner the pawls $b^\times$ $c^\times$ of the other ratchet-wheels, so that the pulleys $a$, $b$, $c$ are enabled to rotate in a reverse direction, and thus permit the descent of the fork or equivalent device preparatory to lifting and carrying another mass of hay.

What I claim as my invention, and desire to secure by Letters Patent, is—

1. The stop $e$ of the draught-rope C, in combination with the carriage B and the track A, operating substantially as and for the purpose specified.

2. The arrangement of the three pulleys with their accompanying pawls and ratchets upon the carriage B, and in relation with the draught-rope, substantially as and for the purpose specified.

3. The combination of the lever-arm $n$, crank-arms $n'$, $n^*$, connecting-rod F, and stud $s$, with the pawls and ratchets of the pulleys $a$, $b$, $c$ of the carriage B, substantially as and for the purpose specified.

JOSEPH F. NUGENT.

Witnesses:
 RODNEY DURKEE,
 JAS. NEDDER.